Figure 1:
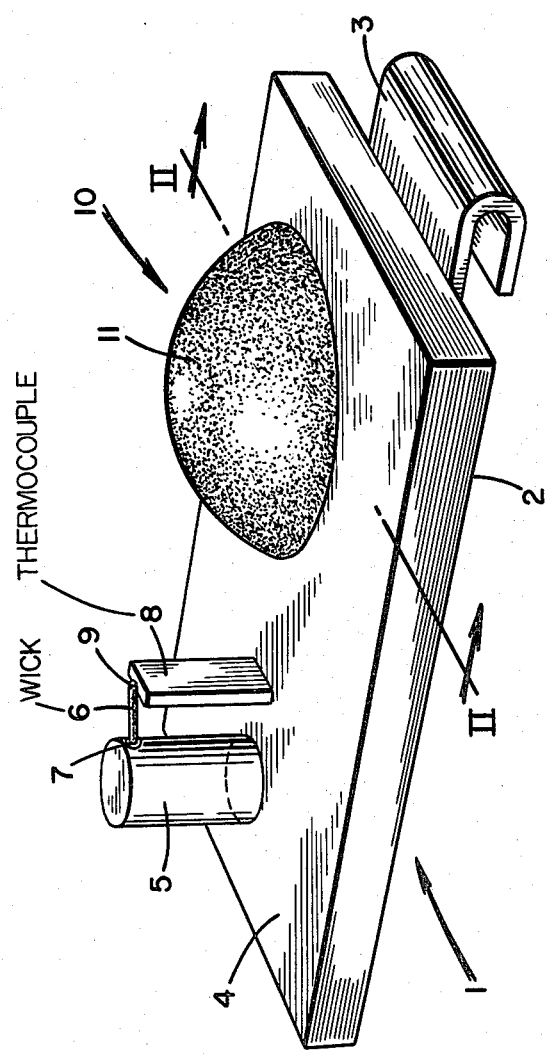

United States Patent [19]

Sassi et al.

[11] 4,364,398

[45] Dec. 21, 1982

[54] INDIVIDUAL GAUGE FOR THE MICROCLIMATE INDEX

[75] Inventors: Carlo Sassi, Segrate; Antonio Vicini, Milan, both of Italy

[73] Assignee: Industrie Pirelli S.p.A., Milan, Italy

[21] Appl. No.: 163,511

[22] Filed: Jun. 27, 1980

[30] Foreign Application Priority Data

Jul. 6, 1979 [IT] Italy .................................. 24141 A/79

[51] Int. Cl.³ .............................. A61B 5/05; G01J 5/00
[52] U.S. Cl. ..................................... 128/736; 128/664; 374/129
[58] Field of Search .......................... 73/355 R, 339 C; 128/736

[56] References Cited

U.S. PATENT DOCUMENTS

| | | | |
|---|---|---|---|
| 2,548,550 | 4/1951 | Minter | 73/368.2 X |
| 3,280,636 | 10/1966 | Tomberg | 128/736 X |
| 3,831,435 | 8/1974 | Hoffman et al. | 73/77 |
| 3,855,863 | 12/1974 | Kuehn et al. | 73/339 C |
| 3,992,942 | 11/1976 | Kuehn et al. | 73/339 C X |
| 4,073,190 | 2/1978 | MacHattie et al. | 73/339 C |
| 4,151,831 | 5/1979 | Lester | 128/736 |

FOREIGN PATENT DOCUMENTS 1269516  9/1960  France .............................. 73/339 C Primary Examiner—Daniel M. Yasich
Attorney, Agent, or Firm—Stevens, Davis, Miller & Mosher

[57] ABSTRACT

An individual gauge for measuring the thermal stresses to which a person is subjected has minature components which adapts the gauge to be supported on an individual. The gauge has two thermoelectric sensors such as thermocouples one of which is associated with a water-wet wick and the other is associated with a black surface exposed to the surrounding atmosphere. The sensors are connected through adding and integrating circuits for emitted signals to an electromagnetic memory for recording the signals.

5 Claims, 2 Drawing Figures

U.S. Patent　　　Dec. 21, 1982　　　4,364,398

INDIVIDUAL GAUGE FOR THE MICROCLIMATE INDEX

The present invention relates to an individual gauge for the microclimate index, i.e. to a device to be applied to a person for measuring the thermal stresses to which the person is subjected.

It is known that the determination of the thermal stresses to which a person is subjected, in particular during working hours, is very important in order to be able to prevent diseases.

At present, devices for measuring individual microclimate indexes of a person are not known so it is presently the practice to determine the individual microclimate by measuring the single microclimate parameters in a predetermined position within a zone of the room and assigning to each of the persons present in the room zone, the value found in the predetermined position.

It is evident that the measurement of the microclimate index made up to now in a predetermined point of a room is very unsatisfactory since the measurement assigns the same value to persons who operate in different points of the room, move within the room from different directions and work in different ways and therefore are thus subjected to greatly different thermal stresses.

Moreover, the known devices for measuring the microclimate in a predetermined position within a room are very encumbering, very delicate and involve an excessively long transition time.

In fact, the known devices for measuring the microclimate index, generally called W B G T index, involve the use of two thermometers, a wet bulb-thermometer and a globe-thermometer.

In particular, the globe-thermometer is a very encumbering instrument since it has a hollow sphere of copper, blackened on the outer surface, having a diameter of about 15 cm. The sphere contains a thermometer whose bulb is fixed in correspondence to the center of the sphere.

Moreover, the globe-thermometer requires a transition time of 25 minutes during which the values notified by it are not significant for the determination of the microclimate.

It is therefore an object of this invention to provide an improved device for measuring the microclimate parameters surrounding a person. Another object of the invention is to provide a device for measuring the microclimate parameters surrounding a person which is adapted to be fastened to the clothes worn by the person or to be mounted on the person's body. Another object of the invention is to provide a device which measures the microclimate parameters surrounding a person with minature thermoelectric sensors which has a transition time which is practically nil. Still another object of the invention is to provide a device for measuring the microclimate surrounding a person which stores the data obtained.

Figure 2:
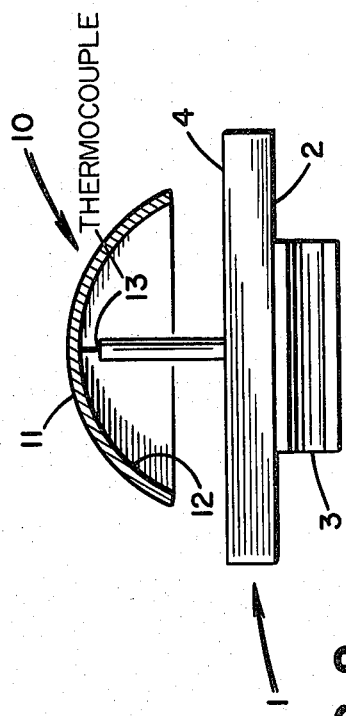

Other objects of the invention will become apparent from the following description with reference to the accompanying drawing wherein FIG. 1 is a perspective view of one embodiment of a device provided by the invention for measuring the microclimate parameters surrounding a person; and FIG. 2 is a partial section taken along the line II—II of FIG. 1.

The foregoing objects are accomplished in accordance with this invention, generally speaking, by providing an individual gauge for microclimate parameters, characterized by the fact of comprising a first thermoelectric sensor associated to a wick projecting from a closed envelope filled with water and a second thermoelectric sensor associated to a black body, said first and said second thermoelectric sensors being connected, through a first adder circuit and a second integrating circuit for emitted signals, to an electromagnetic memory for recording the signals. In the most general idea of realization of an individual gauge for microclimate parameters according to the present invention, the gauge comprises two thermoelectric sensors, as for example thermoelectric couples, thermoresistances, thermistors and the like, and particularly a first thermoelectric sensor connected to a wick projecting from a closed envelope filled with water and a second thermoelectric sensor associated to a black body constituted by a metallic bowl having the surface turned towards the room, which is a blackened surface.

The two thermoelectric sensors are then connected, in association with a timer, to a first adder circuit and consequently to a second signal integrating circuit which performs the operations that will be described later on, and this signal integrating circuit is in turn associated to a signal storing circuit from which the signals can be drawn when desired.

FIGS. 1 and 2 illustrate a microclimate individual gauge according to the present invention falling within the above general description.

As shown in FIGS. 1 and 2 an individual gauge for the microclimate index according to the present invention has a box-shaped i.e. parallelepiped shaped hollow casing body or base 1 to which a hook 3 is attached on its outer face 2 for connecting the box-shaped body 1 to the clothes of a person.

A closed envelope (hollow cylindrical housing) 5, containing water, is fixed to the face 4 of the box-shaped body 1. A wick 6, projecting with one end from said envelope 5 through a hole 7 in the envelope wall, is submerged in the water contained in the envelope.

On the side of the closed envelope 5 there is a first thermoelectric sensor, represented by a thermoelectric couple 8 (or other equivalent sensor) connected with the end 9 of the wick 6. The thermoelectric couple 8 takes the temperature of the end 9 of the wick 6 emitting a signal, the intensity of the signal depending on the temperature of the end 9 of the wick 6.

An inverted bowl shaped housing 10, preferably a semispherical shaped metallic housing, is supported on the face 4 of the box-shaped body 1 (see also FIG. 2). The convex surface 11 of the semi-spherical bowl, which is blackened, is turned towards the outside, i.e. does not face the surface 4 of the box-shaped body 1.

A thermoelectric sensor, represented by a thermocouple or other equivalent sensor, is fixed (for example by a welding operation) in correspondence of the goemetrical center of the inner concave surface 12 of the semi-spherical bowl 10. The sensor emits signals of an intensity depending upon the temperature existing in correspondence of the focus of the semi-spherical bowl 10.

The electric signals emitted by the thermocouples 8 and 13 are integrated by conventional circuits, not shown, (but contained in the box-shaped body) and set in motion according to a frequency pre-established by a timer. Suitable circuits are conventional and can be designed by a technician of the field based on the operations required of them which will be described later on when the working of the individual gauge for the microclimate index according to the present invention will be explained.

The signals integrated by the above indicated electric circuit are then stored in an electromagnetic circuit, encased in the box-shaped body 1 too, not shown, but of a known type such as that shown in U.S. Pat. No. 3,855,863, from which it is possible to draw the stored signals when desired.

Obviously, within the box-shaped body 1 there are also electric energy sources, as for example piles, for the working of the previously indicated circuits.

According to an alternative embodiment, not shown, the spherical bowl 10 has a concave surface 12 blackened and turned towards the outside of the gauge, i.e. the surface is arranged so as not to be in front of the face 4 of the box-shaped body 1 and the second thermocouple 13 is fixed in correspondence to the geometric center of the convex surface 11 which is instead turned towards the face 4 of the box-shaped body 1.

The working of an individual gauge for the microclimate index according to the present invention is the following.

An operator, for whom it is desired to determine the thermal stresses to which he is subjected during a pre-established period, applies to his clothes the device shown in FIG. 1 through the hook 3 at zero moment.

During the interval of the pre-established time, depending on the humidity variations of the ambient surrounding the operator, the intensity of the signals "tu" emitted by the thermocouples 8 changes and at the same time, in consequence of the variations of radiant energy striking the operator, the signals "tg" emitted by the thermocouple 13.

The signals emitted by the thermocouples 8 and 13 reach, according to a pre-established frequency for intervention of a timer, the adder and integrating circuits which amplify them, emitting signals T according to the following formula pre-established by regulations issued by the American Conference of Governmental Industrial Hygienists, relating to the thermal stresses:

$$0.3\ tg + 0.7\ tu = T$$

The signals are sent to the storing circuit which records them.

At the end of the pre-established period of time, the operator removes from his clothes the device shown in FIG. 1 and the device is placed into communication, through an electric cable, with an apparatus, known per se, which draws the signals stored by the individual gauge for microclimate index and records and/or visualizes them.

From the above description it is clear that by means of an individual gauge for the microclimate index according to the present invention, the aimed purposes are achieved.

In fact, the use of a gauge for the microclimate index according to the present invention makes it possible to determine, for each person, the thermal stresses to which he is subjected.

This fact is important for prevention of diseases due to thermal stresses and this is made possible by using miniature elements necessary for the determination of the microclimate index and in particular a miniature element which measures the radiations striking the user, with the instrument previously described.

The thermocouple 13 in the described embodiment may be replaced by any other suitable sensor.

Although the invention has been described in detail for the purpose of illustration, it is to be understood that such detail is solely for that purpose and that variations can be made therein by those skilled in the art without departing from the spirit and scope of the invention except as it may be limited by the claims.

We claim:

1. An individual device for determining the microclimate index of a person independently of that of other persons within the overall surroundings which comprises a base, means on the base for attaching the device to a person's clothes, a closed container for storage of water mounted on the base, a wick having one of its ends submerged in the water and projecting outwardly from the container, a first means connected to said wick for thermoelectric sensing of the temperature of the wick wet with water and for emitting a signal having an intensity dependent upon the sensed temperature, a black-surfaced outwardly convex semispherical hollow metallic member supported with its open side facing said base and its black convex surface facing the surrounding atmosphere, a second thermoelectric sensing means for sensing the temperature existing in correspondence of the focus of the concave surface of said black surfaced member and for emitting a signal having an intensity dependent upon the sensed temperature, means for connecting said sensing means comprising adding the integrating means for conducting said emitted signals to an electromagnetic memory in said base for recording the emitted signals, and providing values for the equation:

$$0.3\ tg + 0.7\ tu = T$$

wherein
  tg is the signal from the first thermoelectric sensing means;
  tu is the signal from the second thermoelectric sensing means; and
  T is the microclimate index, from which said index is calculated, each of said components having a size which adapts the device to be supported on a person.

2. The device of claim 1, characterized by the fact that the black body is a metallic bowl blackened on the convex surface, said convex surface being turned outside towards the device and the thermoelectric sensor is fixed to the concave surface of the bowl in correspondence of the geometric center of the bowl.

3. The device of claim 1, characterized by the fact that the black body is a metallic bowl blackened on its concave surface, said concave surface being turned towards the device outside and the thermoelectric sensor being bound to the convex surface of the bowl in correspondence of the geometric center of the bowl.

4. The individual device of claim 2 or 1 characterized by the fact that the metallic bowl is semi-spherical in shape.

5. A device for determining the microclimate index immediately surrounding a person independently of that of other persons within the overall surroundings which comprises a base, means on the base for attaching the device to a person's clothing, a closed container for storage of water mounted on the base, a wick having one of its ends submerged in the water and projecting outwardly from the container, a first means connected to said wick for thermoelectric sensing of the temperature of the wick wet with water and for emitting a signal having an intensity dependent upon the sensed temperature, a black surfaced outwardly convex semi-spherical hollow metallic member supported with its open side facing said base and its black convex surface facing the surrounding atmosphere, a second thermoelectric sensing means for sensing the temperature of the atmosphere fixed to the concave surface of said black surfaced member and for emitting a signal having an intensity dependent upon the sensed temperature, means for connecting said sensing means comprising adding and integrating means for conducting said emitted signals to an electromagnetic memory in said base for recording the emitted signals, and providing values for the equation:

$$0.3\, t_g + 0.7\, t_u = T,$$

wherein $t_g$ is the signal from the first thermoelectric sensing means;

$t_u$ is the signal from the second thermoelectric sensing means; and

T is the microclimate index, from which said index is calculated, each of said components having a size which adapts the device to be supported on a person.

* * * * *